(12) United States Patent
Lebeck et al.

(10) Patent No.: US 11,450,034 B2
(45) Date of Patent: Sep. 20, 2022

(54) TECHNIQUES FOR ENABLING MULTIPLE MUTUALLY UNTRUSTED APPLICATIONS TO CONCURRENTLY GENERATE AUGMENTED REALITY PRESENTATIONS

(71) Applicant: University of Washington, Seattle, WA (US)

(72) Inventors: Kiron Lebeck, Seattle, WA (US); Tadayoshi Kohno, Seattle, WA (US); Franziska Roesner, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 0 days.

(21) Appl. No.: 17/413,516

(22) PCT Filed: Dec. 11, 2019

(86) PCT No.: PCT/US2019/065797
§ 371 (c)(1),
(2) Date: Jun. 11, 2021

(87) PCT Pub. No.: WO2020/123707
PCT Pub. Date: Jun. 18, 2020

(65) Prior Publication Data
US 2022/0012923 A1 Jan. 13, 2022

Related U.S. Application Data

(60) Provisional application No. 62/778,587, filed on Dec. 12, 2018.

(51) Int. Cl.
*G06T 11/00* (2006.01)
(52) U.S. Cl.
CPC ................................. *G06T 11/00* (2013.01)

(58) Field of Classification Search
None
See application file for complete search history.

(56) References Cited

U.S. PATENT DOCUMENTS 6,097,393 A 8/2000 Prouty, IV
6,738,040 B2 5/2004 Jahn
(Continued)

FOREIGN PATENT DOCUMENTS

KR 20120009638 A 2/2012

OTHER PUBLICATIONS

Lebeck, Kiron, et al. "Arya: Operating system support for securely augmenting reality." IEEE Security & Privacy 16.1 (2018): 44-53.
(Continued)

*Primary Examiner* — Robert J Craddock
(74) *Attorney, Agent, or Firm* — Christensen O'Connor Johnson Kindness PLLC

(57) ABSTRACT

In some embodiments, an augmented reality system is provided. The augmented reality system is configured to detect real-world objects, create software objects that represent the real-world objects, receive requests from applications to present virtual objects at locations associated with the real-world objects, and to present the virtual objects. In some embodiments, an operating system of the augmented reality system is configured to resolve conflicts between requests from multiple applications. In some embodiments, the operating system of the augmented reality system is configured to provide information to applications to allow the applications to avoid or resolve conflicts amongst themselves.

19 Claims, 12 Drawing Sheets

(56) References Cited

U.S. PATENT DOCUMENTS

| | | | |
|---|---|---|---|
| 8,164,543 B2 | 4/2012 | Seder | |
| 8,264,505 B2 | 9/2012 | Bathiche | |
| 10,990,505 B2* | 4/2021 | Papp | G06F 3/0482 |
| 2006/0262140 A1 | 11/2006 | Kujawa | |
| 2012/0007852 A1 | 1/2012 | Morate | |
| 2012/0146894 A1 | 6/2012 | Yang | |
| 2013/0249942 A1 | 9/2013 | Green | |
| 2013/0278633 A1* | 10/2013 | Ahn | G06T 19/006 |
| | | | 345/633 |
| 2014/0122643 A1 | 5/2014 | Jung | |
| 2014/0123306 A1* | 5/2014 | Jung | H04L 63/10 |
| | | | 726/27 |
| 2014/0192084 A1 | 7/2014 | Latta | |
| 2015/0071555 A1 | 3/2015 | Loris | |
| 2015/0074506 A1 | 3/2015 | Dunn | |
| 2016/0042563 A1 | 2/2016 | Ur | |
| 2016/0049013 A1 | 2/2016 | Tosas Bautista | |
| 2016/0350978 A1 | 12/2016 | Mount | |
| 2016/0370855 A1 | 12/2016 | Lanier | |
| 2017/0365100 A1 | 12/2017 | Walton | |
| 2018/0053352 A1 | 2/2018 | Finding | |
| 2018/0165854 A1 | 6/2018 | Du | |
| 2018/0345129 A1* | 12/2018 | Rathod | A63F 13/213 |
| 2018/0357480 A1 | 12/2018 | Bailey | |

OTHER PUBLICATIONS

Lebeck, Kiron, Tadayoshi Kohno, and Franziska Roesner. "Enabling multiple applications to simultaneously augment reality: Challenges and directions." Session 5: Human Matters. HotMobile '19, Feb. 27-28, 2019, Santa Cruz, CA, USA.

Lebeck, Kiron, et al. "Securing augmented reality output." 2017 IEEE symposium on security and privacy (SP). IEEE, 2017.

Maass, Stefan, and Jürgen Döllner. "Efficient View Management for Dynamic Annotation Placement in Virtual Landscapes." In: A. Butz et al. (Eds.): SG 2006, LNCS 4073, pp. 1-12, 2006.

MacIntyre, Blair, et al. "The Argon AR Web Browser and standards-based AR application environment." 2011 10th IEEE International Symposium on Mixed and Augmented Reality. IEEE, 2011.

"Pokemon Go." Niantic. <https://pokemongolive.com/en/> [Retrieved Feb. 1, 2022], 5 pages.

Roesner, Franziska, Tadayoshi Kohno, and David Molnar. "Security and privacy for augmented reality systems." Preprint. A revised version will appear in the Communications of the ACM. 2013. 10 pages.

Tönnis, Marcus, David A. Plecher, and Gudrun Klinker. "Representing information—Classifying the Augmented Reality presentation space." Computers & Graphics 37.8 (2013): 997-1011.

International Search Report and Written Opinion dated Apr. 16, 2020, issued in corresponding International Application No. PCT/US2019/065797, filed Dec. 11, 2019, 12 pages.

ABI Research, "ABI Research Shows Augmented Reality on the Rise With Total Market Worth to Reach $100 Billion by 2020," Nov. 19, 2015, <https://www.abiresearch.com/press/abi-research-shows-augmented-reality-rise-total-ma/> [retrieved Mar. 2017], 2 pages.

Azuma, R., et al., "Recent Advances in Augmented Reality," IEEE Computer Graphics and Applications 21(6):34-47, Nov.-Dec. 2001.

Azuma, R.T., et al., "A Survey of Augmented Reality," Presence: Teleoperators and Virtual Environments 6(4):355-385, Aug. 1997.

Baldwin, R., "Mini's Weird-Looking AR Goggles Are Actually Useful," Engadget, Apr. 22, 2015, <http://www.engadget.com/2015/04/22/bmw-mini-qualcomm-ar/> [retrieved Mar. 2017], 13 pages.

Butz, A., et al., "Enveloping Users and Computers in a Collaborative 3D Augmented Reality," Proceedings of the 2nd IEEE and ACM International Workshop on Augmented Reality (IWAR '99), Article No. 35, San Francisco, Oct. 20-21, 1999, 10 pages.

Continental Automotive Global, "Augmented Reality Head-up Display—Continental," Aug. 7, 2014, video file, retrieved from <https://www youtube.com/watch?v=3uuQSSnO7IE> [retrieved Mar. 22, 2017], 3 pages.

Costanza, E., et al., "Mixed Reality: A Survey," in Lalanne, D., and J. Kohlas (eds), "Human Machine Interaction," Springer-Verlag: Berlin-Heidelberg, vol. 5440, 2009, pp. 47-68.

D'Antoni, D., et al., "Operating System Support for Augmented Reality Applications," Proceedings of the 14th Workshop on Hot Topics in Operating Systems (HotOS XIV), Paper No. 21, Santa Ana Pueblo, N.M., May 13-15, 2013, pp. 1-7.

Epstein, J., et al., "Evolution of a Trusted B3 Window System Prototype," Proceedings of the IEEE Symposium on Security and Privacy, Oakland, Calif., May 4-6, 1992, pp. 226-239.

Gansel, S., et al., "An Access Control Concept for Novel Automotive HMI Systems," Proceedings of the 19th ACM Symposium on Access Control Models and Technologies (SACMAT '14), London, Ontario, Canada, Jun. 25-27, 2014, pp. 17-28.

Greenberg, S., et al., "Dark Patterns in Proxemic Interactions: A Critical Perspective," Proceedings of the Conference on Designing Interactive Systems (DIS '14), Vancouver, B.C., Canada, Jun. 21-25, 2014, pp. 523-532.

Haeuslschmid, R., et al., "A Design Space to Support the Development of Windshield Applications for the Car," Proceedings of the CHI Conference on Human Factors in Computing Systems, Santa Clara, Calif., May 7-12, 2016, pp. 5076-5091.

Jana, S., et al., "Enabling Fine-Grained Permissions for Augmented Reality Applications With Recognizers," Proceedings of the 22nd USENIX Conference on Security, Washington, D.C., Aug. 14-16, 2013, pp. 415-430.

Jana, S., et al., "A Scanner Darkly: Protecting User Privacy From Perceptual Applications," Proceedings of the IEEE Symposium on Security and Privacy, San Francisco, May 19-22, 2013, pp. 349-363.

Kelley Blue Book, "Hyundai Augmented Reality Demonstration—CES 2015," Jan. 14, 2015, video file, retrieved from <https://www.youtube.com/watch?v=iZg89ov75QQ> [retrieved Mar. 22, 2017], 3 pages.

Lebeck, K., et al., "How to Safely Augment Reality: Challenges and Directions," Proceedings of the 17th International Workshop on Mobile Computing Systems and Applications (HotMobile '16), St. Augustine, Fla., Feb. 23-24, 2016, pp. 45-50.

Livingston, M.A., et al., "Military Applications of Augmented Reality," in B. Furht (ed.), "Handbook of Augmented Reality," Springer, New York, 2011, pp. 671-706.

MacIntyre, B., et al., "DART: A Toolkit for Rapid Design Exploration of Augmented Reality Experiences," Proceedings of the 17th Annual ACM Symposium on User Interface Software and Technology, Santa Fe, N.M., Oct. 24-27, 2004, pp. 197 206.

Mathews, L., et al., "Microsoft's HoloLens Demo Steals the Show at Build 2015," Geek.com, Apr. 30, 2015, <http://www.geek.com/microsoft/microsofts-hololens-demo-steals-the-show-at-build-2015-1621727/> [retrieved Mar. 22, 2017], 4 pages.

May, M., "Augmented Reality in the Car Industry," CompleteCar.ie, Aug. 1, 2015, <https://www.linkedin.com/pulse/augmented-reality-car-industry-melanie-may> [retrieved Mar. 22, 2017], 6 pages.

Meta Company, "Meta2 Development Kit," Metavision, <https://www.metavision.com> [retrieved Mar. 22, 2017], 9 pages.

Microsoft, "Microsoft HoloLens for business and enterprise," <https://www.microsoft.com/microsoft-hololens/en-us/commercial> [retrieved Mar. 22, 2017], 12 pages.

Microsoft, "Microsoft HoloLens," <https://www.microsoft.com/microsoft-hololens/en-us> [retrieved Mar. 22, 2017], 7 pages.

Mizokama, K., "The F-35's $400,000 Third-Generation 'Magic' Helmet Is Here," Popular Mechanics, Mar. 4, 2016, <http://www.popularmechanics.com/military/weapons/news/a19764/the-f-35s-third-generation-magic-helmet-is-here/> [retrieved Mar. 22, 2017], 8 pages.

Naraine, R., "Windows XP SP2 Turns 'On' Pop-up Blocking," InternetNews.com, Mar. 18, 2004, <http://www.internetnews.com/dev-news/article.php/3327991> [retrieved Mar. 22, 2017], 8 pages.

Ng-Thow-Hing, V., et al., "User-Centered Perspectives for Automotive Augmented Reality," 2013 IEEE International Symposium on Mixed and Augmented Reality—Arts, Media, and Humanities (ISMAR-AMH), Adelaide, S.A., Australia, Oct. 1-4, 2013, pp. 13-22.

(56) References Cited

OTHER PUBLICATIONS

Papagiannakis, G., et al., "A Survey of Mobile and Wireless Technologies for Augmented Reality Systems," Computer Animation and Virtual Worlds 19(1):3-22, Feb. 2008.

Raval, N., et al., "MarkIt: Privacy Markers for Protecting Visual Secrets," Proceedings of the ACM International Joint Conference on Pervasive and Ubiquitous Computing: Adjunct Publication (UbiComp '14 Adjunct), Seattle, Sep. 13-17, 2014, pp. 1289-1295.

Roesner, F., and T. Kohno, "Securing Embedded User Interfaces: Android and Beyond," Proceedings of the 22nd USENIX Conference on Security (SEC'13), Washington, D.C., Aug. 14-16, 2013, pp. 97-111.

Roesner, F., et al., "Security and Privacy for Augmented Reality Systems," Review Articles, Communications of the ACM 57(4):88-96, Apr. 2014.

Roesner, F., et al., "World-Driven Access Control for Continuous Sensing," Proceedings of the ACM SIGSAC Conference on Computer and Communications Security (CCS '14), Scottsdale, Arizona, Nov. 3-7, 2014, pp. 1169-1181.

Rosenblum, A., "Augmented Reality Glasses Are Coming to the Battlefield," Popular Science, Apr. 22, 2015, <http://www.popsci.com/experimental-ar-glasses-offer-marines-hands-free-intel> [retrieved Mar. 22, 2017], 9 pages.

Schmalstieg, D., et al., "The Studierstube Augmented Reality Project," Presence: Teleoperators and Virtual Environments 11(1):33-54, Feb. 2002.

Shapiro, J.S., et al., "Design of the EROS Trusted Window System," Proceedings of the 13th Conference on USENIX Security Symposium (SSYM'04), San Diego, Aug. 9-13, 2004, vol. 13, Paper No. 12, pp. 1-15.

Sutherland, I.E., "A Head-Mounted Three Dimensional Display," Proceedings of the Dec. 9-11, 1968, Fall Joint Computer Conference, Part I, pp. 757-764.

Tarantola, A., "HoloLens 'Project XRay' Lets You Blast Robot Armies With a Ray Gun Fist," Engadget, Oct. 6, 2015, <http://www.engadget.com/2015/10/06/hololens-project-x-lets-you-blast-robot-armies-with-a-ray-gun/> [retrieved Mar. 22, 2017], 8 pages.

Templeman, R., et al., "PlaceAvoider: Steering First-Person Cameras Away From Sensitive Spaces," Proceedings of the Network and Distributed System Security Symposium (NDSS '14), San Diego, Feb. 23-26, 2014, pp. 1-15.

Tran, C., et al., "A Left-Turn Driving Aid Using Projected Oncoming Vehicle Paths With Augmented Reality," Proceedings of the 5th International Conference on Automotive User Interfaces and Interactive Vehicular Applications, Eindhoven, Netherlands, Oct. 28-30, 2013, pp. 300-307.

Unity, "Develop Mixed Reality Applications With Unity for Microsoft HoloLens," Unity 3D, <https://unity3d.com/pages/window> [retrieved Mar. 22, 2017], 5 pages.

Van Krevelen, D., and R. Poelman, "A Survey of Augmented Reality Technologies, Applications, and Limitations," The International Journal of Virtual Reality 9(2):1-20, 2010.

Vilk, J., et al., "SurroundWeb: Mitigating privacy concerns in a 3D web browser." 2015 IEEE Symposium on Security and Privacy. IEEE, 2015, pp. 431-446.

Wojciechowski, R., "Modeling Interactive Educational Scenarios in a Mixed Reality Environment," Doctoral Dissertation, Technical University of Gdańsk, Poland, Apr. 2008, 186 pages.

Zhou, F., et al., "Trends in Augmented Reality Tracking, Interaction and Display: A Review of Ten Years of ISMAR," Proceedings of the 7th IEEE/ACM International Symposium on Mixed and Augmented Reality, Cambridge, U.K., Sep. 15-18, 2008, pp. 193-202.

Ahn, Surin, et al. "Adaptive fog-based output security for augmented reality." VR/AR Network'18, Aug. 24, 2018, Budapest, Hungary.

Azuma, Ronald, and Chris Furmanski. "Evaluating label placement for augmented reality view management." The Second IEEE and ACM International Symposium on Mixed and Augmented Reality, 2003. Proceedings. IEEE, 2003.

Croatti, Angelo. "Augmented Worlds: a proposal for modelling and engineering pervasive mixed reality smart environments." Alma Mater Studiorum. University of Bologna. PhD in Computer Science and Engineering. Final Exam. (2019).

Ens, Barrett, Juan David Hincapié-Ramos, and Pourang Irani. "Ethereal planes: a design framework for 2D information space in 3D mixed reality environments." Flat Surfaces in 3D Space. SUI'14, Oct. 4-5, 2014, Honolulu, HI, USA.

Ens, Barrett, "Spatial Analytic Interfaces," University of Manitoba, PhD dissertation, Department of Computer Science, 2014, 200 pages.

Figueiredo, Lucas Silva, et al. "Prepose: Privacy, security, and reliability for gesture-based programming." 2016 IEEE Symposium on Security and Privacy. IEEE, 2016.

Gartenberg, C. "Google Maps is gett ing augmented realitydirections and recommendation features." May 8, 2018. The Verge. <https://www.theverge.com/2018/5/8/17332480/google-maps-augmented-reality-directions-walking-ar-street-view-personalized-recommendations-voting> [Retrieved Feb. 1, 2022], 4 pages.

\* cited by examiner

US 11,450,034 B2

TECHNIQUES FOR ENABLING MULTIPLE MUTUALLY UNTRUSTED APPLICATIONS TO CONCURRENTLY GENERATE AUGMENTED REALITY PRESENTATIONS

CROSS-REFERENCE TO RELATED APPLICATIONS

This application claims the benefit of Provisional Application No. 62/778,587, filed Dec. 12, 2018, the entire disclosure of which is hereby incorporated by reference herein for all purposes.

STATEMENT OF FEDERALLY SPONSORED RESEARCH AND DEVELOPMENT

This invention was made with U.S. government support under 1651230 awarded by the National Science Foundation. The government has certain rights in the invention.

SUMMARY

In some embodiments, a computer-implemented method of presenting augmented-reality annotations of real-world objects is provided. An augmented reality system detects a real-world object. An operating system of the augmented reality system creates a software object that represents the real-world object. The operating system receives a first request from a first application to present a first virtual object, the first request referencing the software object. The operating system determines a first location for the first virtual object, wherein the first location is associated with the real-world object. The augmented reality system presents the first virtual object at the first location. In some embodiments, a non-transitory computer-readable medium having computer-executable instructions stored thereon is provided, wherein the instructions, in response to execution by one or more processors of an augmented reality system, cause the augmented reality system to perform such a method. In some embodiments, a computing device configured to perform such a method is provided. In some embodiments, an augmented reality system comprising at least one environmental sensor device, at least one motion sensor device, at least one presentation device and an augmented reality platform device is provided. The augmented reality platform device is communicatively coupled to the at least one environmental sensor device, the at least one motion sensor device, and the at least one presentation device. The augmented reality platform device includes at least one processor and a non-transitory computer-readable medium that has computer-executed instructions stored thereon that, in response to execution by the at least one processor, cause the augmented reality system to perform such a method.

In some embodiments, a computer-implemented method of presenting augmented-reality annotations of real-world objects is provided. An augmented reality system receives a reservation from a first application, wherein the reservation specifies a location reserved by the first application. The augmented reality system receives a request from a second application to generate a presentation. In response to determining that the presentation would not conflict with the reservation, the augmented reality system generates the presentation. In response to determining that the presentation would conflict with the reservation, the augmented reality system deconflicts the presentation and the reservation. In some embodiments, a non-transitory computer-readable medium having computer-executable instructions stored thereon is provided, wherein the instructions, in response to execution by one or more processors of an augmented reality system, cause the augmented reality system to perform such a method. In some embodiments, a computing device configured to perform such a method is provided. In some embodiments, an augmented reality system comprising at least one environmental sensor device, at least one motion sensor device, at least one presentation device and an augmented reality platform device is provided. The augmented reality platform device is communicatively coupled to the at least one environmental sensor device, the at least one motion sensor device, and the at least one presentation device. The augmented reality platform device includes at least one processor and a non-transitory computer-readable medium that has computer-executed instructions stored thereon that, in response to execution by the at least one processor, cause the augmented reality system to perform such a method.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
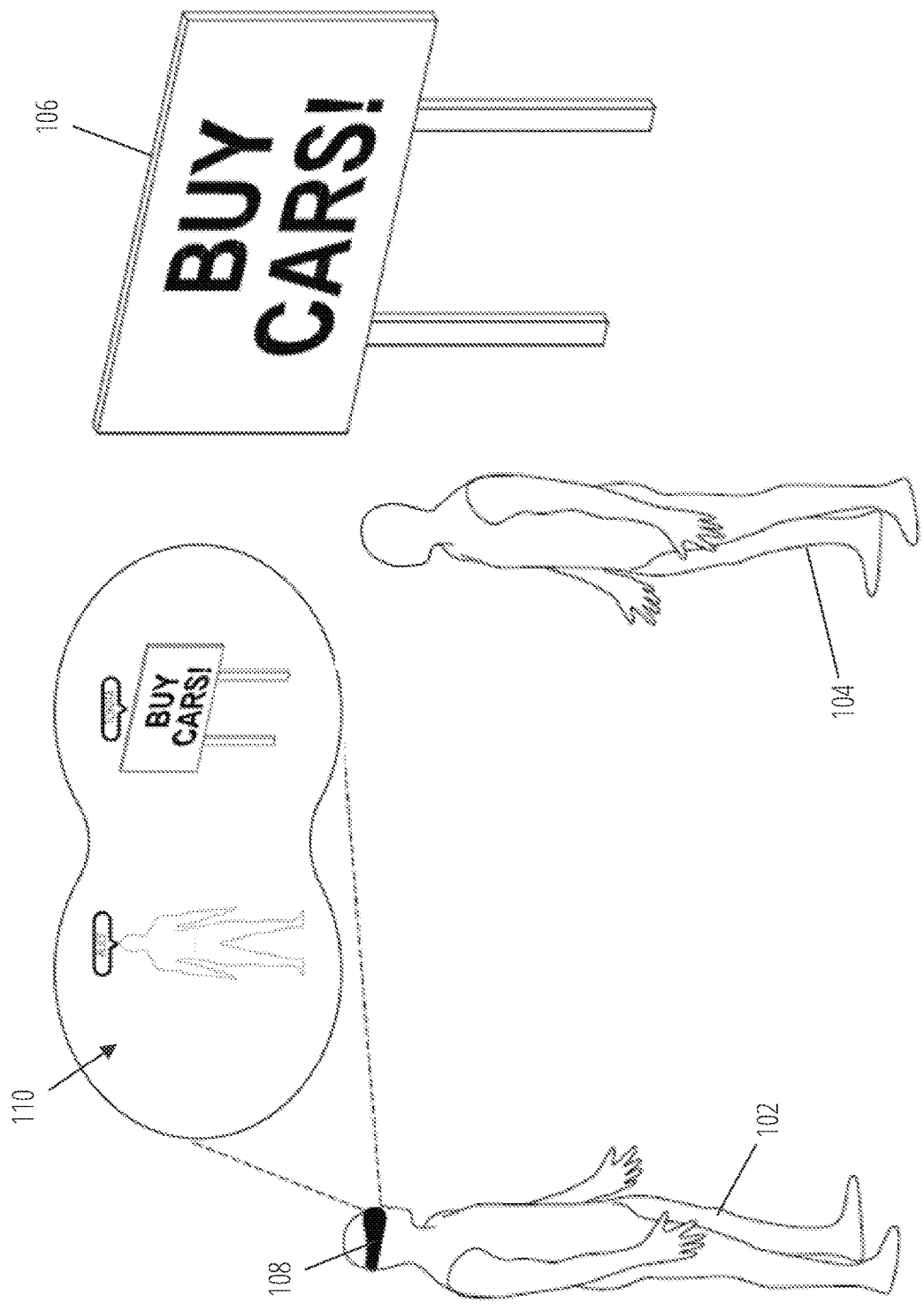
FIG. 1 is an artistic drawing that shows a non-limiting example embodiment of use of an augmented reality system according to various aspects of the present disclosure.

Augmented reality (AR) is ushering in a new era of immersive computing, with devices that can understand a user's physical world and blend 3D content into the user's view of this world. However, most modern AR platforms do not allow users to engage with multiple immersive applications simultaneously, and those that provide multi-application support still have significant limitations. Consider a user who wishes to engage with multiple applications while walking in a city, such as an AR navigation application, an AR game, and social applications that augment nearby people, e.g., by displaying their names above their heads or 3D masks over their faces. On a single-application platform, the user can only view and interact with one application at a time. By contrast, a multi-application platform could allow the user to shift their attention between applications—for example, periodically glancing at directions without closing their game, while still seeing social overlays on nearby people.

Realizing the vision of multi-application AR will require identifying and overcoming new challenges that stem from the unique capabilities of AR platforms. In particular, rather than sharing a flat computer screen, immersive AR applications will share an expansive 3D world within which they must simultaneously display content. This capability raises fundamental questions: how might immersive AR applications visually conflict with each other, and how can multi-application AR platforms allow different applications to simultaneously augment their shared 3D world while mediating conflicts? Prior AR-related efforts primarily focused on individual applications negatively influencing users' perceptions of the real world, rather than on visual conflicts between multiple applications.

The interface that an AR platform provides to applications for displaying content determines the space of available output behaviors. Consider the following:

Single-Application. Inter-application conflicts cannot occur if only one application is allowed to display content at a time. This approach is at odds with our goal of supporting multiple applications.

Windows. One method for preventing output conflicts is to confine applications to separate regions of space—a 3D analogue of the window abstraction used by desktop PCs. We consider a model where windows are controlled by the user and cannot be created or repositioned autonomously by applications. These properties allow windows to visually isolate applications from each other, but in doing so, they trade-off the ability for applications to dynamically generate content throughout the user's world.

Shared World. The final model we consider is a shared world that allows multiple applications to simultaneously display content throughout the user's environment. This approach stands in contrast to windows, sacrificing visual isolation to give applications the flexibility to place AR content wherever they wish. As a result, one application may draw in the same space as another application, or otherwise occlude that application's output. We explore strategies for addressing such conflicts below.

When considering how to manage output conflicts in a shared world, we must first determine who should shoulder this burden. Thus, we explore opportunities for the OS, applications themselves, or the user to take on this responsibility. While we present these design paths individually, we note that they may be combined to manage output in different ways.

As discussed above, giving applications the freedom to place content wherever they wish may lead to occlusion conflicts. We thus begin with two complementary design paths that enable the operating system (OS) to prevent occlusion. AR objects are OS-managed primitives that encapsulate AR output. For example, a single Pokémon character would be one AR object. In OS-mediated approaches, the OS can modify the visual properties of AR objects (e.g., position or transparency) to prevent occlusion. Specifically, we introduce the following approaches:

1. Runtime Policies. The OS prevents occlusion by observing visual interactions between AR objects at runtime and enforcing policies that modify them in response. For example, for a user Alice who is using a Pokémon application, the OS could observe when one of Alice's Pokémon objects occludes a Navigation arrow presented by a navigation application and turn the Pokémon object partially or fully transparent to ensure that Navigation's arrow remains visible. Note that we previously explored the idea of OS-enforced runtime policies in prior work. However, that work focused primarily on visual conflicts between AR objects and real-world objects, where the real world was assumed to take priority, and it did not deeply consider the viability of runtime policies for resolving multi-application conflicts.

2. Declarative Output. The OS provides applications with a language, an API, an object model, or other mechanisms to abstractly indicate their output needs. The OS then controls how these needs are met to prevent occlusion. For example, AR Dating and Social Media applications executed by a user Bob could request to display content above someone's head, and the OS would determine an appropriate layout for the content from both applications. Similarly, a Restaurant Assistant application executed by Alice could place virtual signs in front of restaurants without controlling the precise 3D coordinates of these objects.

A declarative approach can prevent output conflicts even with malicious applications, and it strikes a balance between application flexibility and conflict mediation. The OS can handle application requests in a more predictable manner than run-time policies allow, and applications can exercise more immersive behaviors than a windowed display abstraction supports. Furthermore, this approach does not impose the burden of output management on users or application developers. Even though declarative output cannot support applications that require arbitrary 3D placement, it is well-suited for applications tasked with augmenting specific real-world objects (e.g., AR Dating).

Runtime policies only allow the OS to identify occlusion after it has occurred, and they provide no contextual information about how the OS should respond to individual conflicts. By contrast, declarative output ensures that applications do not conflict in the first place, and by capturing the high-level needs of applications, it gives the OS the ability to intelligently respond to application requests. Consider AR Dating and Social Media from above. If the OS understands that both applications are attempting to augment the same person's head, it could (for example) arrange content so that both applications are visible above the person's head, rather than making one application's objects invisible.

In providing more effective mediation capabilities, declarative output may trade off the ability to support fine-grained object placement for applications. Declarative output naturally caters to applications that can specify their output needs in terms of high-level visual relationships to physical-world objects. However, this approach does not lend itself to apps such as Alice's Pokémon game, which needs to create and move characters at precise 3D locations in Alice's world. For applications such as Pokémon that cannot operate under a declarative model, runtime policies provide the OS with a potential fallback mechanism for mediating conflicts.

We observe that in preventing occlusion in a shared world, the OS constrains the output behaviors of applications. In doing so, the OS may enable new forms of conflict. Recall the example runtime policy in which Pokémon's object is made transparent when it occludes Navigation's arrow. This policy allows Navigation to induce visual modifications in Pokémon's objects by placing arrows behind them. A declarative approach can also enable new conflicts—for example, the OS may deny an application's request to display content if it cannot determine an acceptable layout that would accommodate this request without causing occlusion.

As another cautionary example, consider a least-recently-used (LRU) mechanism that identifies overlapping objects and removes those that the user has interacted with least recently. In some situations, an LRU mechanism might be a reasonable way of addressing overlapping objects, but in other situations, an LRU mechanism could lead to undesirable behavior. When applied as a runtime policy or declarative output tool, an LRU mechanism enables even well-intentioned applications to inadvertently evict each other. Furthermore, a malicious application could leverage an LRU runtime policy to probe for the locations of other applications' objects by observing when its own objects are evicted, using this information to surround a victim application's objects and occlude them.

A limitation of any OS-driven approach is that the OS may not be able to unilaterally decide what visual interactions are problematic. If the OS can determine a prioritization ordering for different applications, it can potentially decide which applications to act upon when mediating conflicts, whether it employs runtime policies, declarative output, or another strategy. However, the notion of what constitutes a conflict may not always be obvious, nor the decision of which application should receive priority.

We next consider the potential for applications to collaborate in avoiding conflicts by sharing information with one another and reacting to each other's requests. For example, if Alice's Navigation application could provide the 3D locations of its directional arrows to Pokémon and request that Pokémon not occlude them, then Pokémon could adjust its behavior while still providing the user with the same overall experience.

Application self-management allows applications to retain control over their outputs and respond to conflicts in predictable ways, in contrast to OS-enforced policies that impose external modifications on application content. The consequence of giving applications this level of control is that self-management is only viable under a threat model where applications are trusted to avoid interfering with each other given the information to do so (e.g., on a closed platform running well-vetted applications that are designed to cooperate). A malicious application could leverage any additional information given to it about other applications to attack them—for example, if Pokémon was malicious and learned precisely where Navigation's arrows were, it could strategically generate objects that occlude those arrows.

We observe that only the user can subjectively determine which conflicts are detrimental to their AR experience. Thus, the final design path we explore is one that leaves mediation to the user's discretion. An AR platform could provide the user with different tools for this task—for example, to demote problematic applications to more restrictive states (e.g., confining them to windows), to delete individual AR objects, or to provide applications with behavioral cues (e.g., to instruct an application to avoid displaying content in specific spaces).

The OS also has an opportunity to inform the user's actions by enabling the user to easily discern potential conflicts. Consider a user Carol who believes that an application she is using is presenting an annotation with incorrect information. Carol believed this application to be misbehaving, but the OS could inform her that the problematic object came from another application. Furthermore, the user may be unaware that certain conflicts have actually occurred. For example, unbeknownst to Alice, her Tour Guide application displayed fake restaurant ratings that hid the overlays of Restaurant Assistant. The OS could identify such visual interactions and provide Alice with this information so that she can act according to her wishes.

FIG. 1 is an artistic drawing that shows a non-limiting example embodiment of use of an augmented reality system according to various aspects of the present disclosure. A user 102 is shown wearing a headset 108 of an augmented reality system. The real-world environment of the user 102 is shown as including a first real-world object 104 (another person) and a second real-world object 106 (a billboard). The augmented reality system generates an augmented reality presentation 110, which is presented to the user 102 by the headset 108.

In some embodiments, cameras within the augmented reality system capture images of the first real-world object 104 and second real-world object 106, and include the images within the augmented reality presentation 110, so that the augmented reality presentation 110 may mimic a view that the user 102 would have without wearing the headset 108. Although such a headset 108 that completely covers the eyes of the user 102 is illustrated, in some embodiments, the headset 108 may be translucent or transparent, and the headset 108 may therefore not have to generate presentations of the real-world objects.

Figure 2:
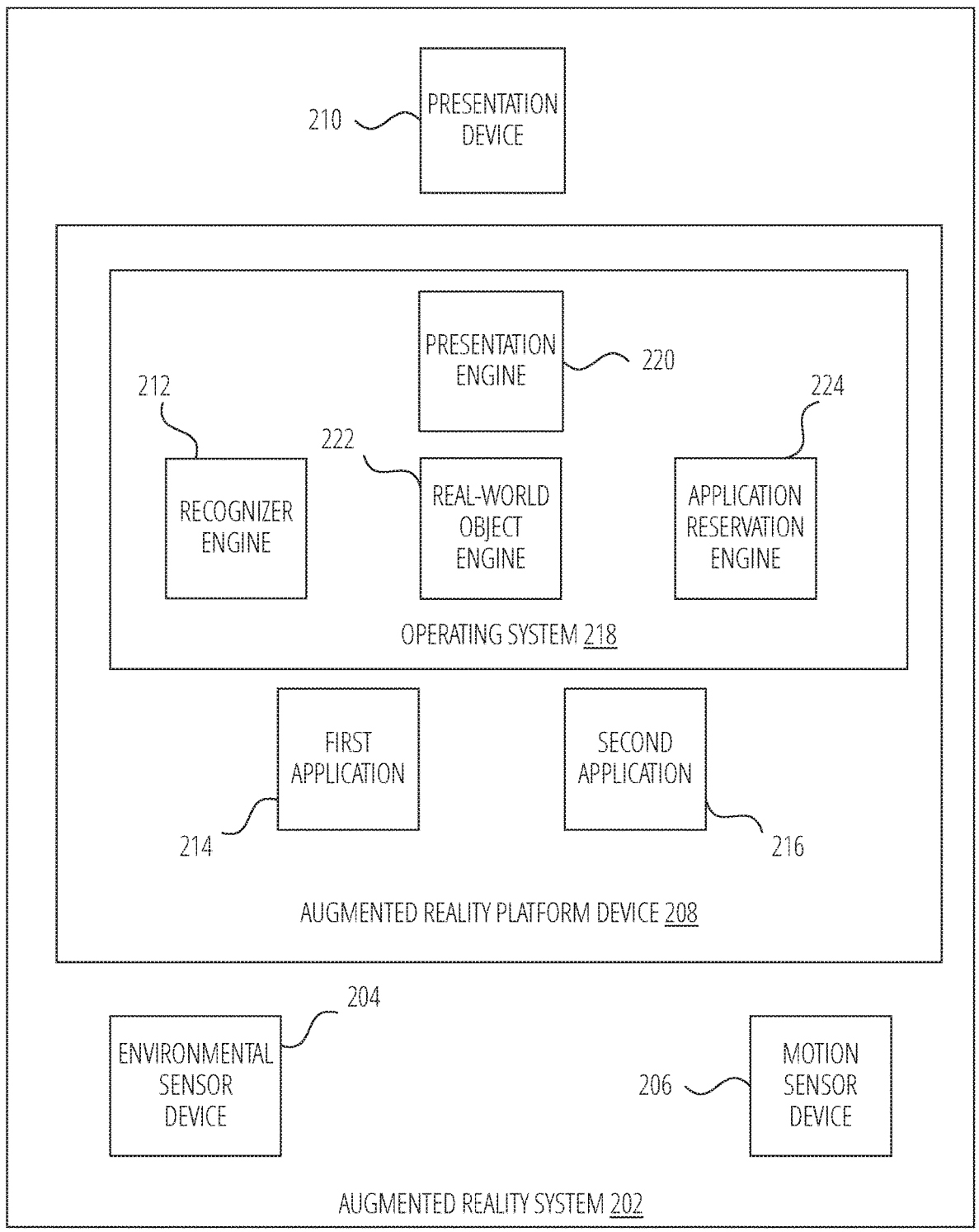
FIG. 2 is a block diagram that illustrates a non-limiting example embodiment of an augmented reality system according to various aspects of the present disclosure.

FIG. 2 is a block diagram that illustrates a non-limiting example embodiment of an augmented reality system according to various aspects of the present disclosure. The augmented reality system 202 includes many components that are typical for augmented reality systems. Though some of these components are illustrated and described herein, other components that are known to one of skill in the art to be present in the augmented reality system 202 are not described for the sake of brevity.

As shown, the augmented reality system 202 includes one or more environmental sensor devices 204, one or more motion sensor devices 206, one or more presentation devices 210, and an augmented reality platform device 208. Typically, the environmental sensor devices 204, motion sensor devices 206, and presentation devices 210 are mounted to a headset that is worn by a user.

In some embodiments, the environmental sensor devices 204 include one or more traditional cameras, infrared cameras, stereoscopic cameras, time-of-flight sensors, LIDAR sensors, and/or other sensors that allow the augmented reality system 202 to collect information about the environment surrounding the augmented reality system 202. The information may be used by other components of the augmented reality system 202 for any purpose, including to detect, locate, and identify real-world objects in the environment.

In some embodiments, the motion sensor devices 206 include one or more accelerometers, gyroscopes, and/or other devices that are configured to detect the motion of the augmented reality system 202 in three-dimensional space. The motion sensor devices 206 allow other components of the augmented reality system 202 to cause an augmented reality presentation to remain stationary with respect to the real world as experienced by the user.

In some embodiments, the presentation devices 210 include one or more display devices, loudspeakers, projectors, and/or other devices that are configured to present virtual objects to the user. Presenting a virtual object may include generating a visual representation of the virtual object, generating an auditory presentation of the virtual object, or both.

In some embodiments, the augmented reality platform device 208 includes one or more computing devices that provide computing resources for the augmented reality system 202. In some embodiments, the augmented reality platform device 208 may be incorporated into the headset. In some embodiments, the augmented reality platform device 208 may be a separate computing device that is communicatively coupled to the headset using any suitable communication technique, including but not limited to wired techniques (including but not limited to Ethernet, USB, and FireWire), wireless techniques (including but not limited to 4G, 5G, LTE, Wi-Fi, WiMAX, and Bluetooth), and/or combinations thereof. Each of the components illustrated as part of the augmented reality platform device 208 may be computer-executable instructions stored on a non-transitory computer-readable medium which, in response to execution by one or more processors of the augmented reality platform device 208, cause the augmented reality platform device 208 to provide the illustrated components.

As illustrated, the augmented reality platform device 208 includes a first application 214, a second application 216, and an operating system 218. In some embodiments, the operating system 218 manages hardware system resources of the augmented reality platform device 208. In some embodiments, the operating system 218 provides interfaces via which software components may communicate with each other and may access the system resources. The operating system 218 may also manage execution of applications, which may include the illustrated first application 214 and second application 216, as well as other applications.

As shown, the operating system 218 includes a recognizer engine 212, a real-world object engine 222, an application reservation engine 224, and a presentation engine 220. The operating system 218 may also include other traditional components including but not limited to schedulers, memory managers, and so on. Since these other components are known to those of skill in the art, they have not been described in detail herein for the sake of brevity.

In some embodiments, the recognizer engine 212 is configured to receive information from the environmental sensor devices 204, and to detect real-world objects based on the information. For each real-world object detected by the recognizer engine 212, the recognizer engine 212 also determines a type of the real-world object (e.g. "human," "wall," "billboard," "picture frame," "car," etc.) using any suitable technique, including but not limited to a convolutional neural network. The recognizer engine 212 may provide the detected real-world objects and their types to the real-world object engine 222, and may continue to track the location of the detected real-world objects to allow virtual objects to be presented in a proper location.

In some embodiments, the real-world object engine 222 receives indications from the recognizer engine 212 regarding the presence and types of real-world objects in the environment, and creates software objects to represent them. In some embodiments, the real-world object engine 222 may expose the software objects to applications in order to allow the applications to take actions with respect to the real-world objects. For example, the software objects may include properties that expose the coordinates detected for the real-world object, thus allowing an application to create a presentation of a virtual object that coincides with the location of the real-world object. As another example, the software objects may include methods, callbacks, or other mechanisms that allow applications to request that the operating system 218 presents a virtual object in a specified location with respect to the real-world object. Certain technical benefits may be provided by building such functionality into the operating system 218. As one non-limiting example of a technical benefit, embedding such functionality in the operating system 218 allows the operating system 218 to deconflict requests from multiple applications that would overlap or otherwise conflict with each other without requiring that the applications have any knowledge of each other.

In some embodiments, the application reservation engine 224 is configured to receive requests from applications to reserve given volumes for presentations by the applications. The application reservation engine 224 may then share the reservations with other applications to allow the applications to deconflict presentations, and/or may process requests from applications for presentations to ensure that the reservations are not violated. In some embodiments, the operating system 218 may include both a real-world object engine 222 and an application reservation engine 224. In some embodiments, the operating system 218 may include only one of the real-world object engine 222 or the application reservation engine 224.

In some embodiments, the presentation engine 220 is configured to present virtual objects using the presentation devices 210. In some embodiments, the presentation engine 220 may handle keeping virtual objects in a fixed relationship with respect to real-world objects. For virtual objects that include a visual component, presentation of a virtual object may include causing one or more display devices of the presentation devices 210 to show the virtual object such that it appears with the fixed relationship with respect to real-world objects. For virtual objects that include an auditory component, presentation of a virtual object may include causing one or more loudspeakers of the presentation devices 210 to generate an auditory presentation that is in an apparent auditory position that stays in a fixed relationship with respect to real-world objects.

As used herein, "engine" refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, Python, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

Further description of the actions performed by the components of the augmented reality system 202 is provided in the discussion below.

Figure 3:
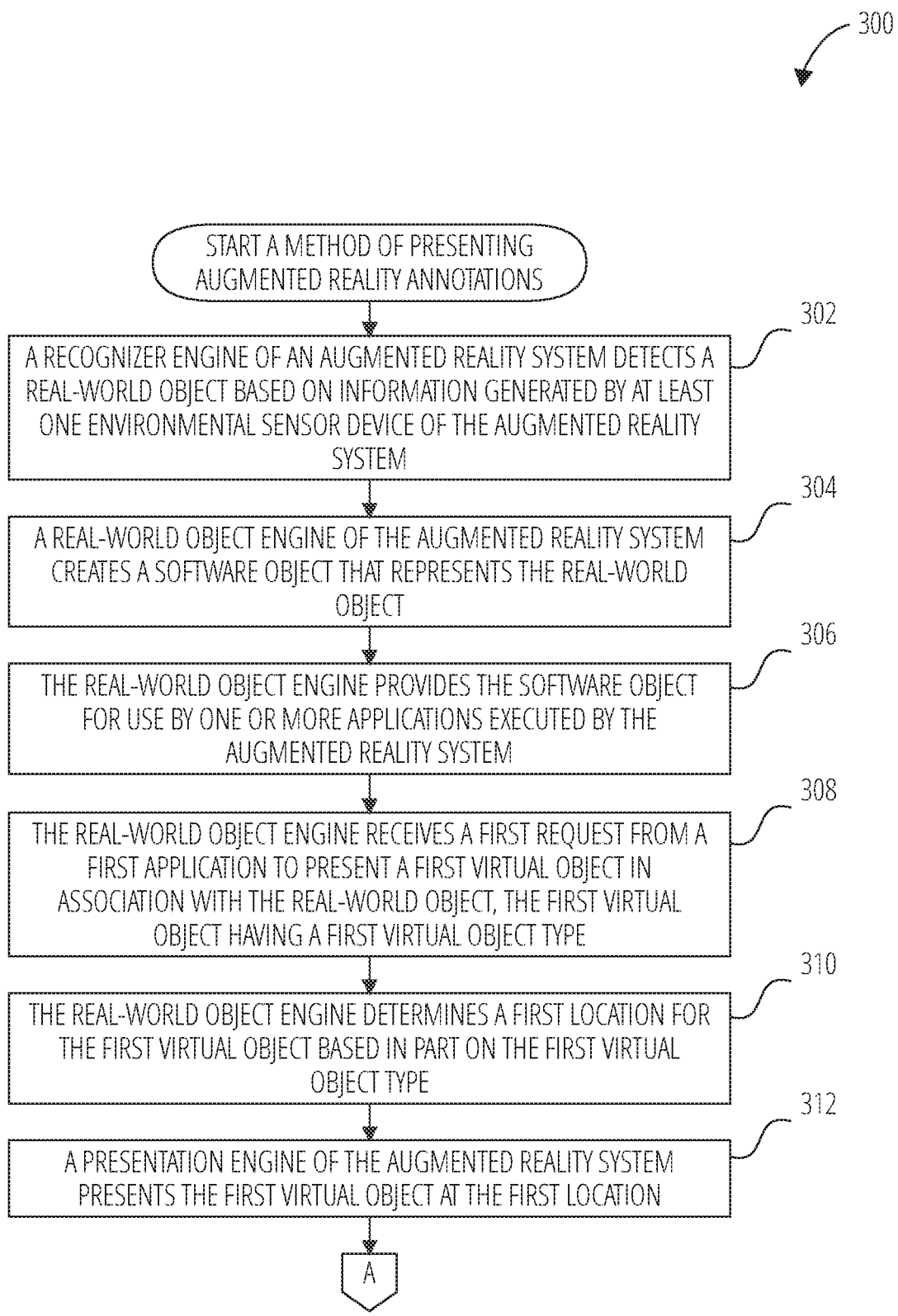
FIG. 3-FIG. 5 are a flowchart that illustrates a non-limiting example embodiment of a method of presenting augmented reality annotations according to various aspects of the present disclosure.
Figure 4:
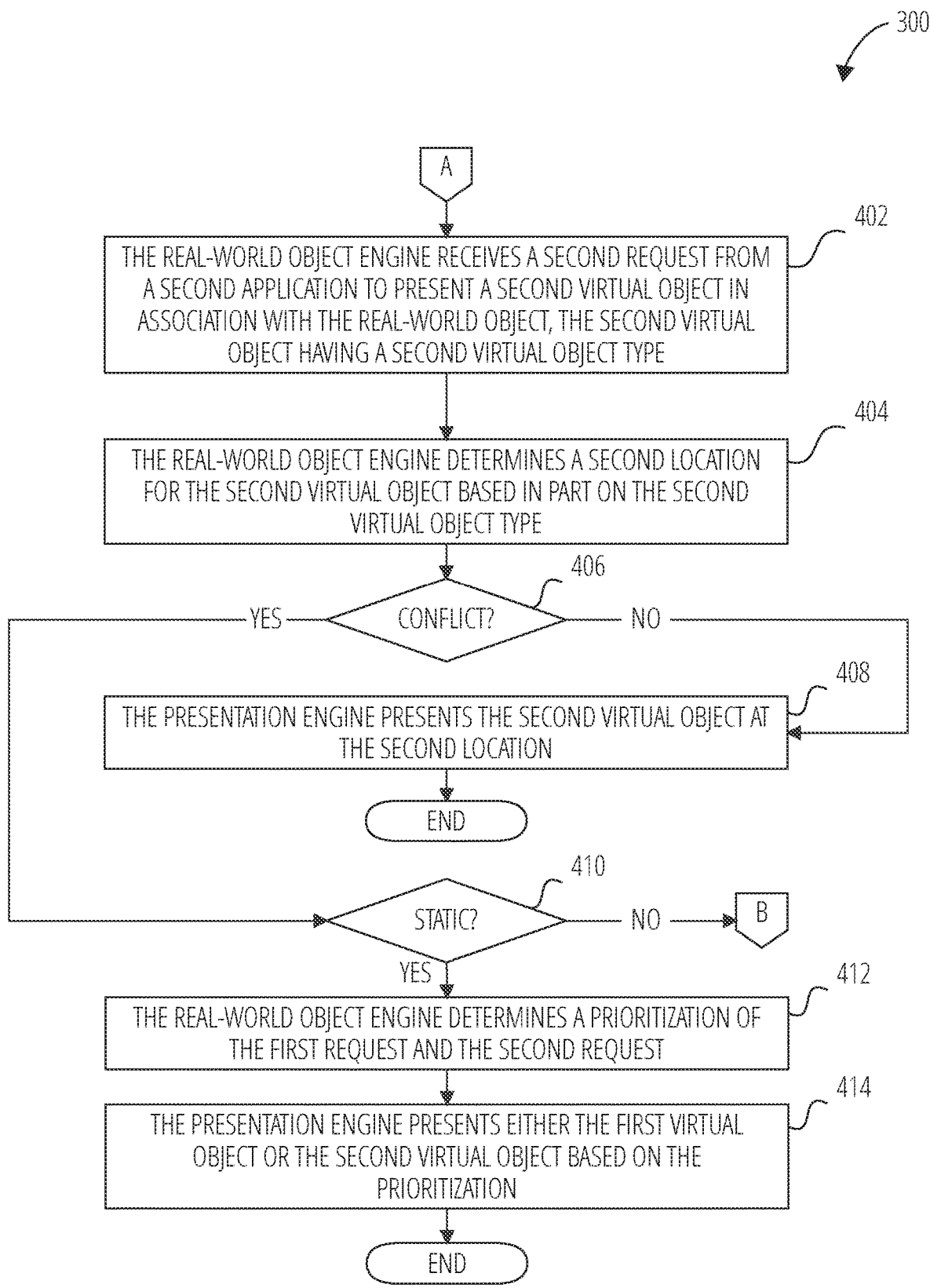
Figure 5:
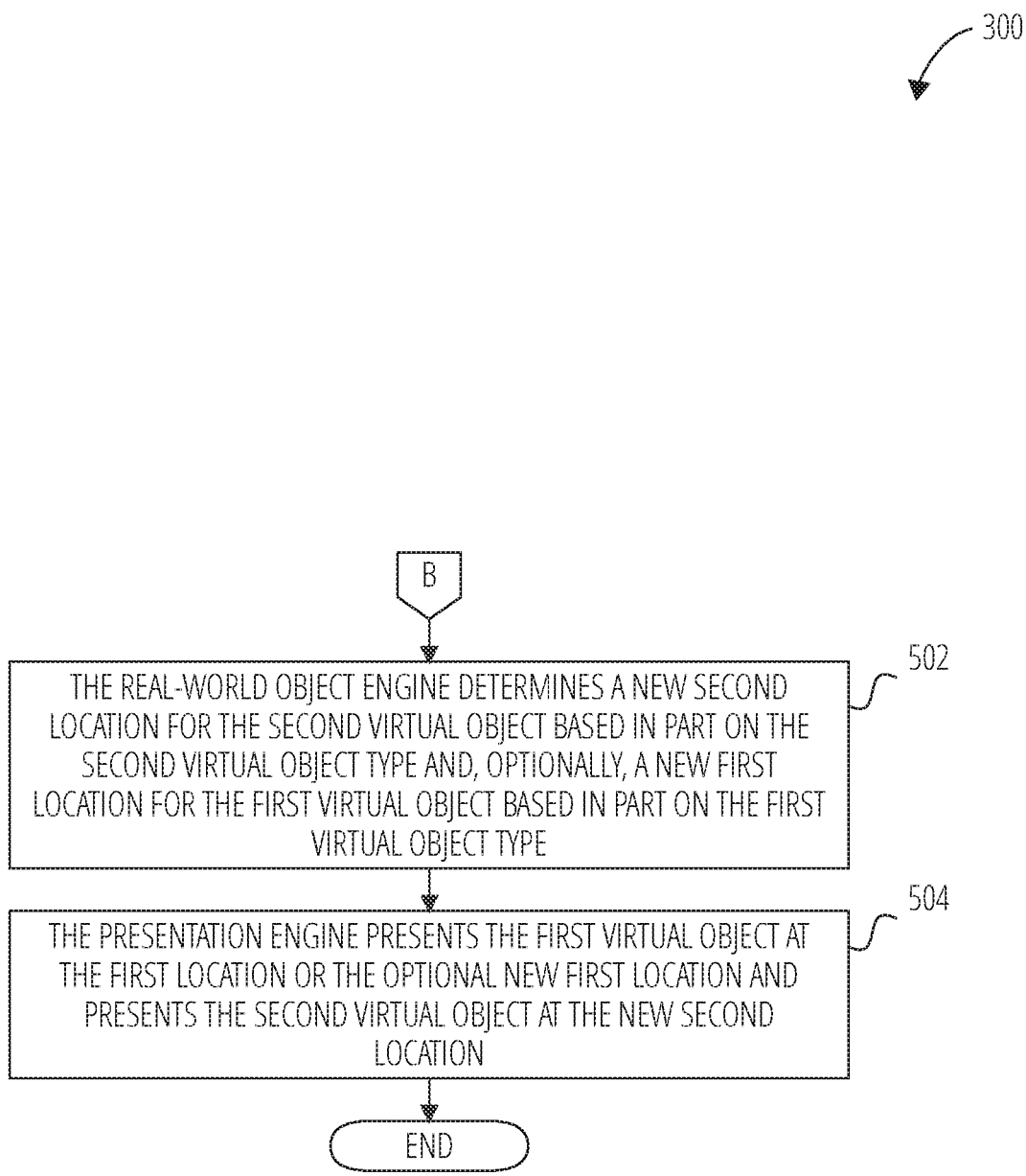

FIG. 3-FIG. 5 are a flowchart that illustrates a non-limiting example embodiment of a method of presenting augmented reality annotations according to various aspects of the present disclosure. The flowchart is a non-limiting example embodiment of a method 300 that provides declarative support within the operating system 218 for the presentation of virtual objects in association with real-world objects. The operating system 218 exposes software objects that represent real-world objects to applications, and the applications can use the software objects to cause presentation of the virtual objects.

From a start block, the method 300 proceeds to block 302, where a recognizer engine 212 of an augmented reality system 202 detects a real-world object based on information generated by at least one environmental sensor device 204 of the augmented reality system 202. Throughout the description of the method 300, detection and processing of a single real-world object is described to improve the clarity of the discussion. In some embodiments (including the embodiments illustrated in FIG. 6-FIG. 9), multiple real-world objects may be concurrently detected by the augmented reality system 202 instead of only a single real-world object.

The recognizer engine 212 may use any suitable technique to detect the real-world object, including but not limited to using one or more machine learning models (including but not limited to convolutional neural networks) to analyze two-dimensional and/or three-dimensional video information generated by the environmental sensor devices 204 to detect the real-world object. Any type of real-world object may be detected, including but not limited to humans, surfaces (such as walls, doors, floors, roads, and/or tables), vehicles, billboards, display devices (such as televisions and/or computer monitors), and picture frames.

Figure 6:
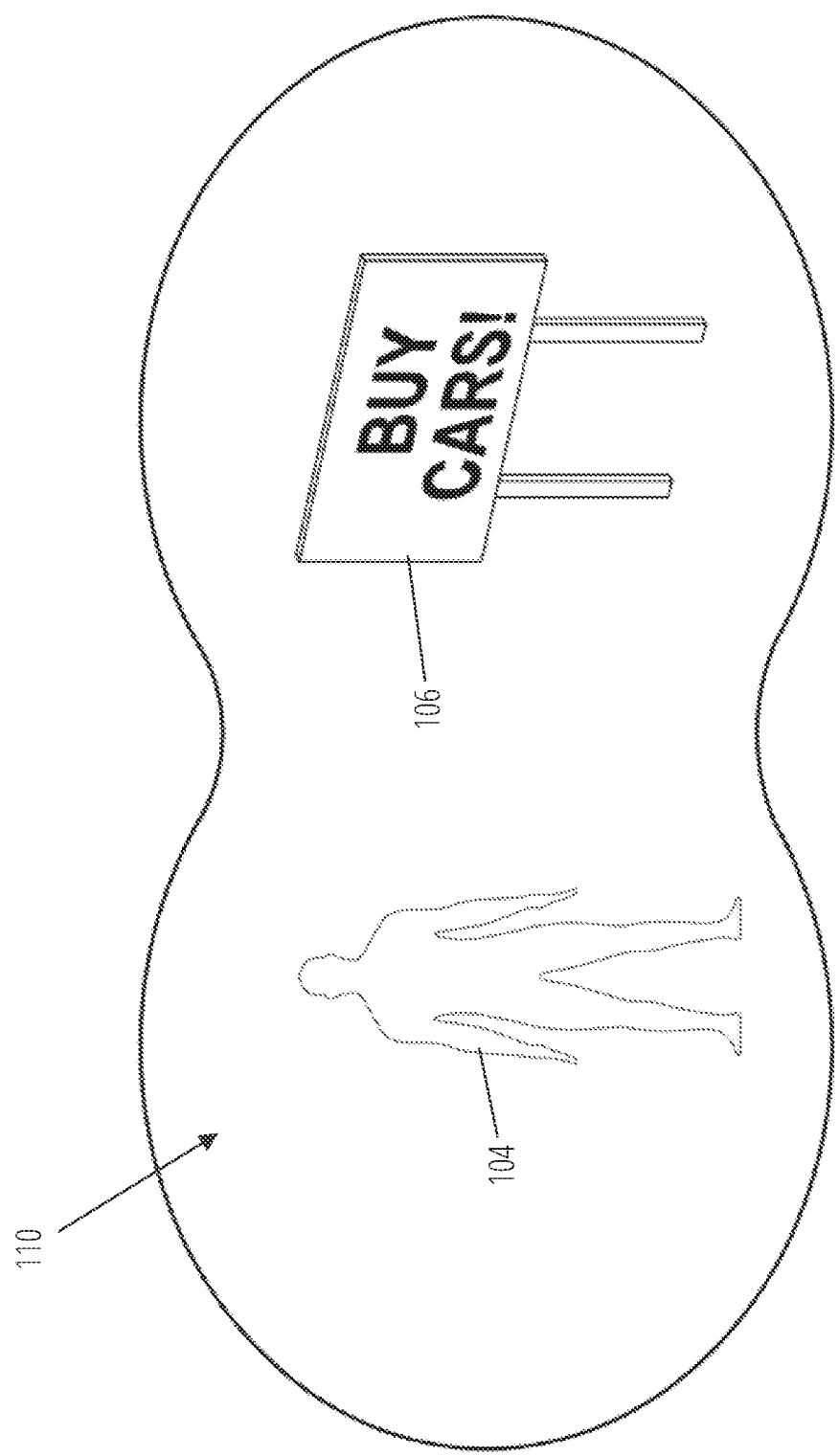
FIG. 6 is an artistic drawing that shows a non-limiting example embodiment of a detail view of an augmented reality presentation according to various aspects of the present disclosure.

FIG. 6 is an artistic drawing that shows a non-limiting example embodiment of a detail view of an augmented reality presentation according to various aspects of the present disclosure. In the augmented reality presentation 110 illustrated in FIG. 6, no augmentation has yet been generated by the augmented reality system 202, but the recognizer engine 212 has detected a human (a first real-world object 104) and a billboard (a second real-world object 106).

Returning to FIG. 3, at block 304, a real-world object engine 222 of the augmented reality system 202 creates a software object that represents the real-world object. In some embodiments, the software object includes an indication of what kind of real-world object is represented. In some embodiments, the software object includes one or more methods, properties, or other elements that allow applications to cause virtual objects to be presented in association with the real-world object.

At block 306, the real-world object engine 222 provides the software object for use by one or more applications executed by the augmented reality system 202. The real-world object engine 222 may make the software object available using any suitable technique, including but not limited to by transmitting the software object to applications registered with the real-world object engine 222 to receive real-world objects, and by providing the software object to applications in response to receiving requests from the applications for real-world objects. In some embodiments, applications may only receive software objects of particular types. For example, an application may be configured to only receive software objects that represent humans.

At block 308, the real-world object engine 222 receives a first request from a first application 214 to present a first virtual object in association with the real-world object, the first virtual object having a first virtual object type. The first request may be received via an API exposed by the real-world object engine 222, by execution of a method of the software object, or by any other suitable technique. The first virtual object type specifies which of several different kinds of virtual objects supported by the real-world object engine 222 the first virtual object is. For example, the real-world object engine 222 may provide support for text annotations, image overlays, textures, and/or audio to be associated with the real-world object, and the first virtual object type may specify which one is desired. In some embodiments, the first virtual object type may allow the application to specify a pre-determined location for the first virtual object, such as in a specific relative location with respect to the real-world object, over a specific portion of the real-world object, or in any other location with respect to the real-world object. In some embodiments, the first virtual object type may also specify whether the location of the first virtual object is a flexible relative location or a static relative location. A flexible relative location is a general location with respect to the real-world object that the real-world object engine 222 is permitted to adjust in order to compensate for conflicts with other virtual objects. A static relative location is a specific location with respect to the real-world object that the real-world object engine 222 is not permitted to adjust (that is, conflicts must be handled using a technique other than moving the location of the first virtual object 802).

Figure 7:
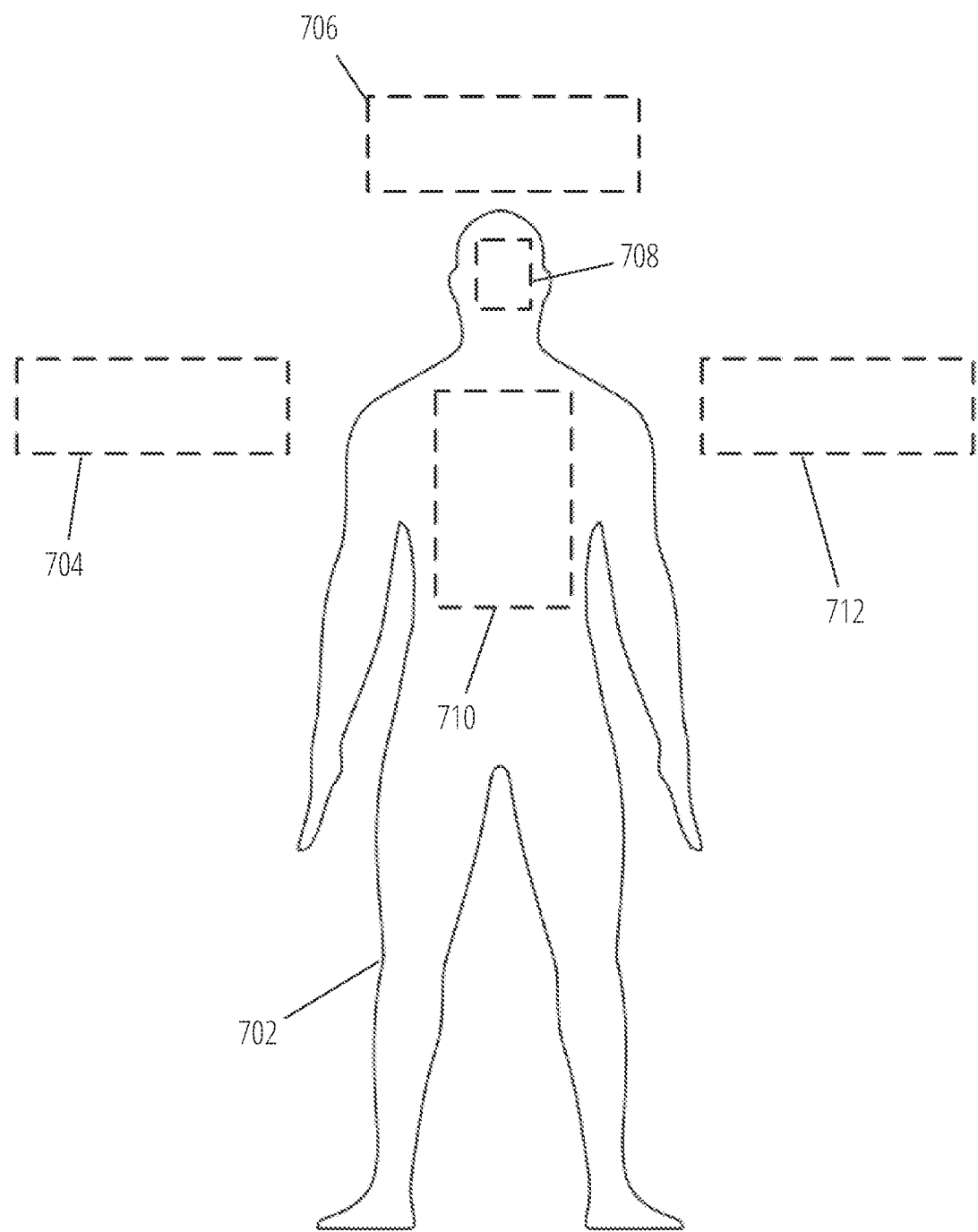
FIG. 7 is an illustration of a non-limiting example embodiment of various locations for a virtual object according to various aspects of the present disclosure.

FIG. 7 is an illustration of a non-limiting example embodiment of various locations for a virtual object according to various aspects of the present disclosure. The illustrated real-world object 702 is a human. As illustrated, a variety of locations are available around the real-world object 702, including a left side location 704, an upper location 706, and a right side location 712; and a variety of locations that overlap the real-world object 702, including a facial location 708 and a torso location 710. For other kinds of real-world objects, other types of locations may be made available. For example, for a real-world object that is a flat surface, one location may simply indicate that the virtual object be presented anywhere on the flat surface to appear that the virtual object is standing on the flat surface, while another location may indicate that the virtual object be presented to cover the entire flat surface.

The left side location 704, the upper location 706, and the right side location 712 are likely to be flexible relative locations, in that the real-world object engine 222 will be allowed to move a virtual object within the vicinity of the specified location in order to overcome conflicts. Such locations may be specified in order to present information associated with the real-world object 702 which should clearly be associated with the real-world object 702 (such as a name, a job title, or any other information associated with the real-world object 702) but that does not have to be in a specific location in order to retain its meaning. For example, a name annotation could be moved slightly up or slightly over to accommodate another annotation within the same general location without losing the usefulness of the name annotation.

The facial location 708 and torso location 710 are likely to be static relative locations, in that the real-world object engine 222 will have to present the virtual object within the specified location. Such locations may be specified in order to present information that obscures a specific portion of the real-world object 702. For example, a face-altering filter would have to be presented in the facial location 708 in order to retain its usefulness. Likewise, an annotation that is supposed to look like a physical name tag would have to be presented within the torso location 710 in order to make sense.

In some embodiments, the virtual object type may specify both which location is to be used and whether that location should be treated as a static relative location or a flexible relative location. In some embodiments, the virtual object type may specify the location to be used, but the location itself may be specified by the real-world object engine 222 as a static relative location or a flexible relative location.

Returning to FIG. 3, at block 310, the real-world object engine 222 determines a first location for the first virtual object based in part on the first virtual object type. For example, the real-world object engine 222 may inspect the first virtual object type to determine which location was selected (e.g., the upper location 706), and may then determine a specific location for a presentation (e.g., to appear three inches above the real-world object, and centered over the real-world object). At block 312, a presentation engine 220 of the augmented reality system 202 presents the first virtual object at the first location. It should be understood that the first location is a virtual location that may be anchored to the real-world object. Accordingly, the presentation may include movement of the first virtual object within presentation devices 210 based on detected motion of the augmented reality system 202, and/or based on detected motion of the real-world object, in order to keep the presentation of the first virtual object at the same relative apparent location with respect to the real-world object.

Figure 8:
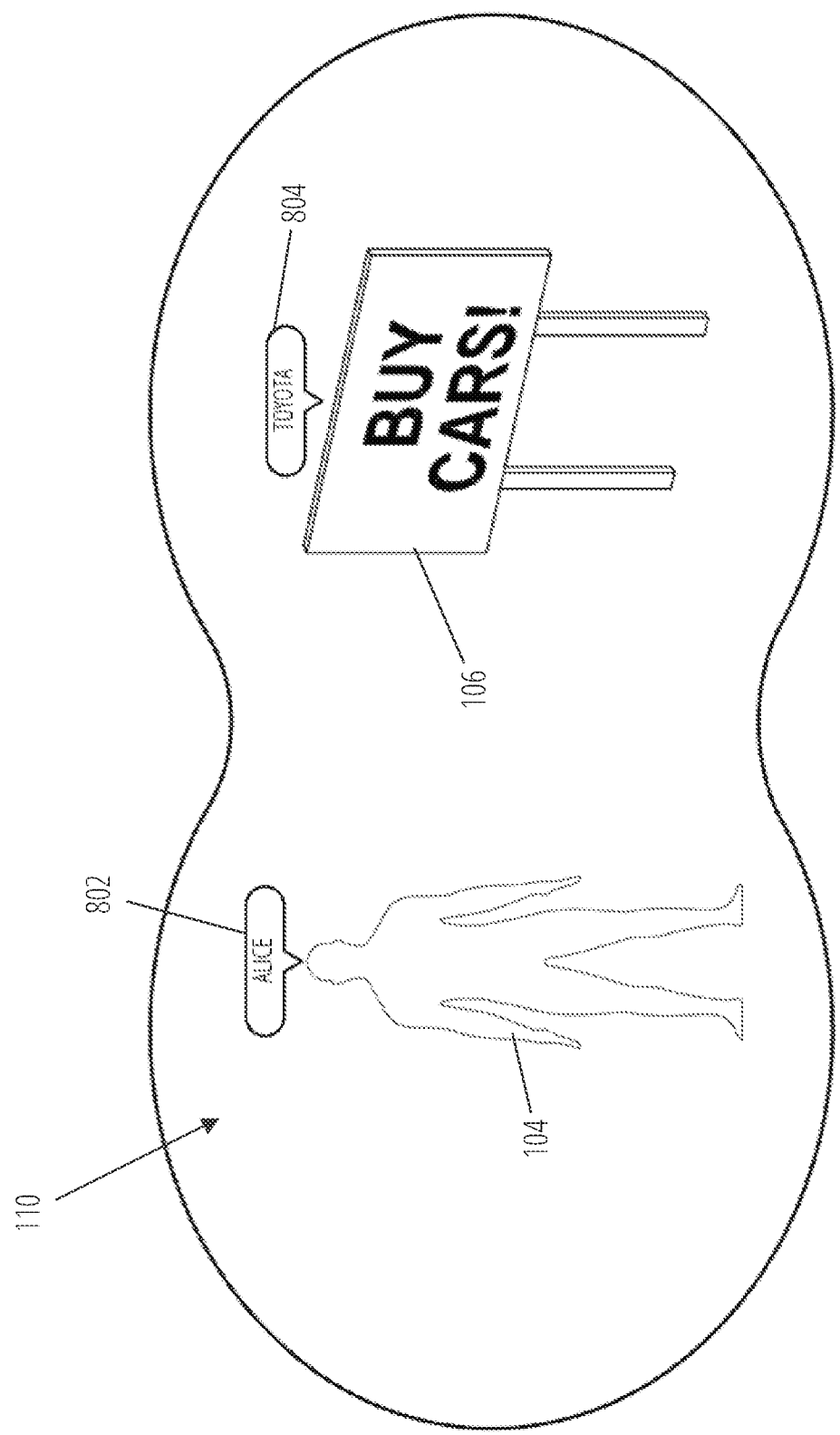
FIG. 8 is an illustration of a non-limiting example embodiment of a presentation of virtual objects according to various aspects of the present disclosure.

FIG. 8 is an illustration of a non-limiting example embodiment of a presentation of virtual objects according to various aspects of the present disclosure. In the augmented reality presentation 110, a first virtual object 802 is presented in an upper location over the first real-world object 104, and a third virtual object 804 is presented in an upper location over the second real-world object 106. As shown, the first virtual object 802 includes a name of the person who was detected and the third virtual object 804 includes a name of a company that paid for the advertisement on the billboard, both of which may have been determined by applications using any suitable technique.

Figure 9:
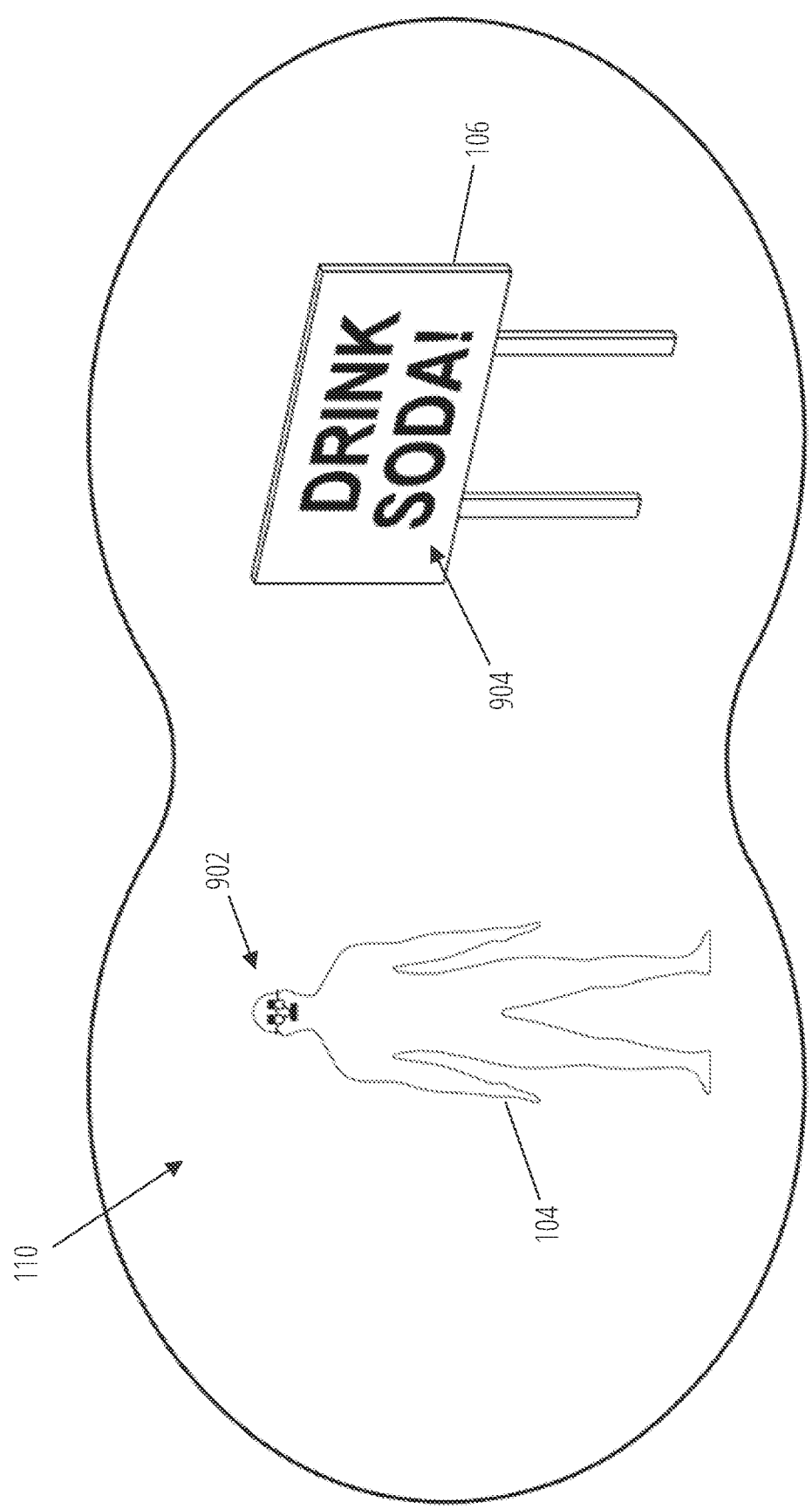
FIG. 9 is an illustration of another non-limiting example embodiment of a presentation of virtual objects according to various aspects of the present disclosure.

FIG. 9 is an illustration of another non-limiting example embodiment of a presentation of virtual objects according to various aspects of the present disclosure. In the augmented reality presentation 110, a first static virtual object 902 is presented in a facial location over the first real-world object 104, and a second static virtual object 904 is presented in a location covering the entire second real-world object 106. The first static virtual object 902 is a filter intended to obscure the face of the first real-world object 104, and the second static virtual object 904 is intended to replace the content of the second real-world object 106. As such, both are placed at static relative locations with respect to the real-world objects.

Returning to FIG. 3, the method 300 then proceeds to a continuation terminal ("terminal A"). From terminal A (FIG. 4), the method 300 proceeds to block 402, where the real-world object engine 222 receives a second request from a second application 216 to present a second virtual object in association with the real-world object, the second virtual object having a second virtual object type. At block 404, the real-world object engine 222 determines a second location for the second virtual object based in part on the second virtual object type.

At decision block 406, the real-world object engine 222 determines whether there is a conflict between the second location and the presentation of the first virtual object. In some embodiments, a conflict may arise if the second virtual object type matches the first virtual object type, which may occur if the second virtual object type is the same as the first virtual object type, or if the types are different but nevertheless specify the same location. In some embodiments, a conflict may arise if the first location and the second location are different, but the second virtual object is large enough or otherwise positioned to obscure the first virtual object if presented in the second location.

If the real-world object engine 222 determines that there is no conflict between the second location and the presentation of the first virtual object, then the result of decision block 406 is NO, and the method 300 proceeds to block 408. At block 408, the presentation engine 220 presents the second virtual object at the second location. The method 300 then proceeds to an end block and terminates.

Returning to decision block 406, if the real-world object engine 222 determines that there is a conflict between the second location and the presentation of the first virtual object, then the result of decision block 406 is YES, and the method 300 proceeds to decision block 410. At decision block 410, the real-world object engine 222 determines whether both of the first location and the second location are static relative locations. If so, then the result of decision block 410 is YES, and the method 300 advances to block 412.

Proceeding from block 412, the real-world object engine 222 must choose one of the virtual objects to be presented because the locations are static relative locations, and so the real-world object engine 222 cannot move either virtual object to resolve the conflict. Accordingly, at block 412, the real-world object engine 222 determines a prioritization of the first request and the second request. In some embodiments, the real-world object engine 222 may prioritize the earliest or latest virtual object to be created as having a higher priority. In some embodiments, the real-world object engine 222 may allow priorities to be set collaboratively when creating the virtual objects, and may determine the priority based on the set priorities. At block 414, the presentation engine 220 presents either the first virtual object or the second virtual object based on the prioritization. The losing application (i.e., the application that created the virtual object that is not presented) may be notified so that the application can react appropriately. The method 300 then proceeds to an end block and terminates.

Returning to decision block 410, if the real-world object engine 222 determines that one of the first location or the second location is not a static relative location, then the result of decision block 410 is NO, and the method 300 advances to a continuation terminal ("terminal B"). From terminal B (FIG. 5), the method 300 advances to block 502, where the real-world object engine 222 determines a new second location for the second virtual object based in part on the second virtual object type and, optionally, a new first location for the first virtual object based in part on the first virtual object type. For example, the real-world object engine 222 could place the second virtual object in a location that doesn't overlap the first location, such as higher or lower than the first location, or next to the first location, without changing the location of the first virtual object. As another example, the real-world object engine 222 could move the first location over or up to fit the second virtual object next to or under the first virtual object. In some embodiments, the second location could be determined as a default location, while the first location is changed to the optional new first location. At block 504, the presentation engine 220 presents the first virtual object at the first location or the optional new first location and presents the second virtual object at the new second location.

Figure 10:
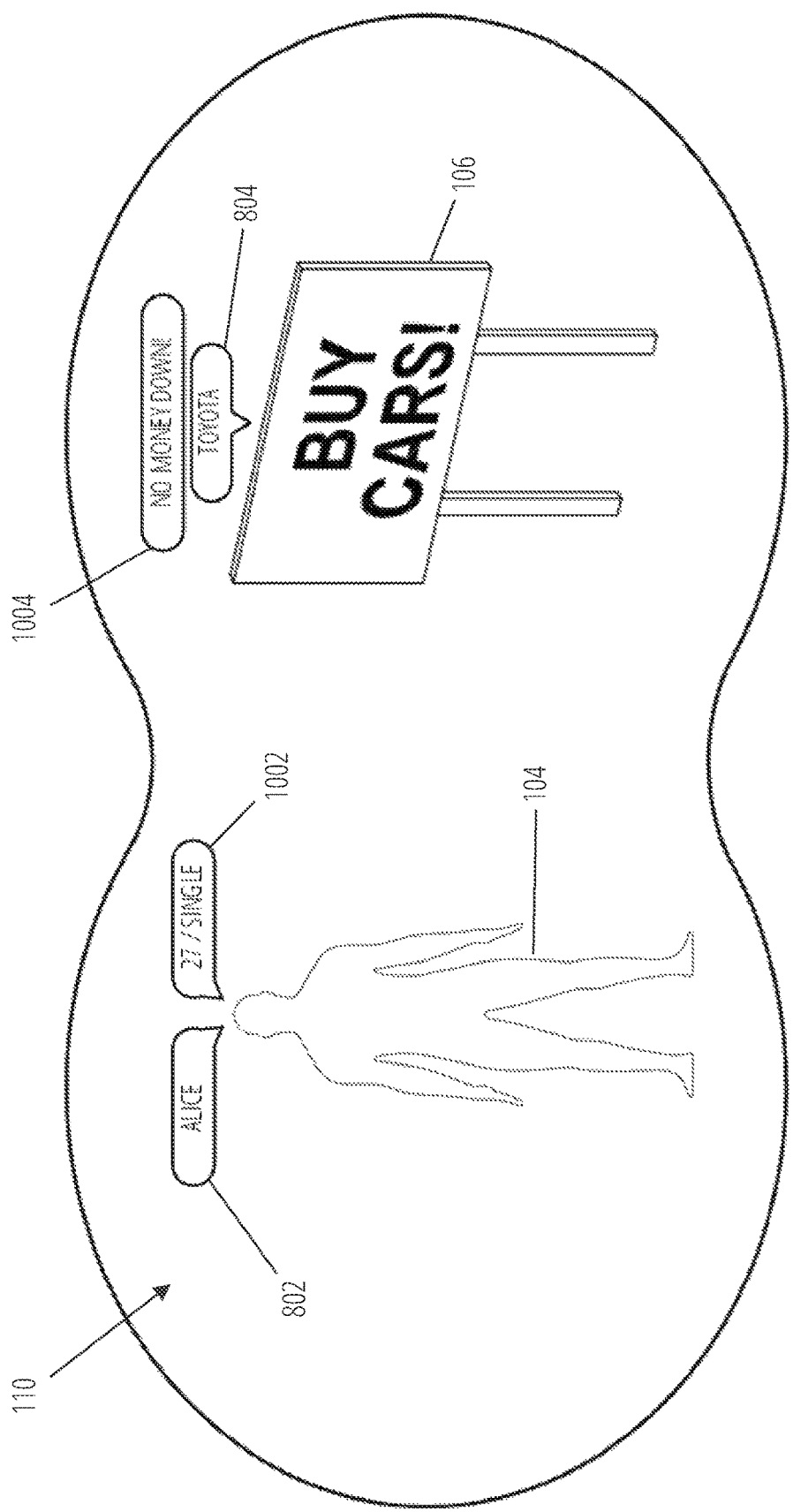
FIG. 10 is an illustration of a non-limiting example embodiment of a presentation of conflicting virtual objects according to various aspects of the present disclosure.

FIG. 10 is an illustration of a non-limiting example embodiment of a presentation of conflicting virtual objects according to various aspects of the present disclosure. In the augmented reality presentation 110, the real-world object engine 222 has received a request for a second virtual object 1002 to be presented in the same location as the first virtual object 802, and a request for a fourth virtual object 1004 to be presented in the same location as the third virtual object 804. Accordingly, the augmented reality presentation 110 shows that the first virtual object 802 has been moved to the left in order to accommodate the second virtual object 1002, which itself has been moved to the right from a default position. To show another strategy for deconflicting the presentations, the augmented reality presentation 110 shows that the third virtual object 804 has been left in its default location, while the fourth virtual object 1004 is moved up to be above the location of the third virtual object 804.

Returning to FIG. 5, the method 300 then proceeds to an end block and terminates.

Figure 11:
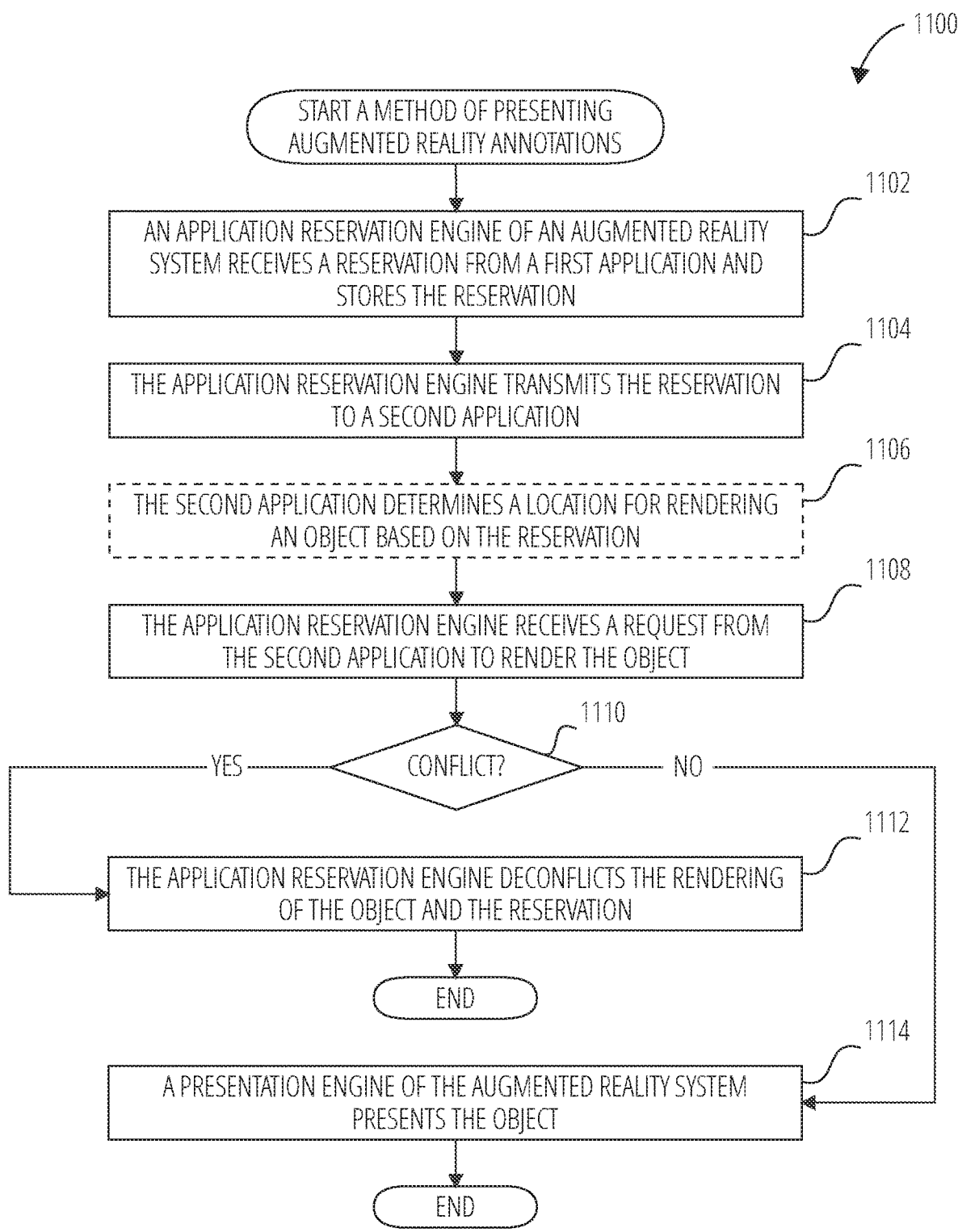
FIG. 11 is a flowchart that illustrates a non-limiting example embodiment of a method of presenting augmented reality annotations according to various aspects of the present disclosure.

FIG. 11 is a flowchart that illustrates a non-limiting example embodiment of a method of presenting augmented reality annotations according to various aspects of the present disclosure. In the method 1100, the operating system 218 provides services to allow applications to resolve conflicts with presentations by other applications themselves, and acts as a mediator if applications nevertheless generate conflicts.

From a start block, the method 1100 proceeds to block 1102, where an application reservation engine 224 of an augmented reality system 202 receives a reservation from a first application 214 and stores the reservation. In some embodiments, the reservation is an indication of a real-world volume or a virtual volume in which the first application 214 intends to present a virtual object, or at least which the first application 214 desires to be clear of other virtual objects. In some embodiments, the first application 214 will eventually present a virtual object within the volume defined by the reservation. In some embodiments, the first application 214 may not present a virtual object within the volume.

At block 1104, the application reservation engine 224 transmits the reservation to a second application 216. In some embodiments, the application reservation engine 224 may transmit the reservation to all other applications running on the augmented reality platform device 208. In some embodiments, the application reservation engine 224 may transmit the reservation in response to a request by the second application 216 for currently active reservations.

At optional block 1106, the second application 216 determines a location for rendering an object based on the reservation. In some embodiments, the second application 216 may determine a location for the object that avoids the reservation, thus avoiding creating a conflict. Optional block 1106 is considered optional because in some embodiments, the second application 216 may simply determine a location for rendering the object without considering the reservation, and may simply rely on the application reservation engine 224 to determine whether a conflict would be created.

At block 1108, the application reservation engine 224 receives a request from the second application 216 to render the object. At decision block 1110, the application reservation engine 224 determines whether rendering the object would conflict with the reservation. In some embodiments, the application reservation engine 224 may compare the location for the object to the volume specified by the reservation, and may determine whether there is a conflict based on whether a portion of the object would be within the volume or would obscure the volume from the viewpoint of the augmented reality system 202.

If rendering the object would conflict with the reservation, then the result of decision block 1110 is YES, and the method 1100 proceeds to block 1112, where the application reservation engine 224 deconflicts the rendering of the object and the reservation. In some embodiments, deconfliction may occur by the application reservation engine 224 refusing to allow the object to be rendered, or by changing a transparency level of the rendering of the object. The application reservation engine 224 may notify the second application 216 of the conflict, and the second application 216 would either take steps to change the location of the object so that the conflict would not occur, or would perform actions to compensate for the lack of presentation of the object. In some embodiments, deconfliction may occur by the application reservation engine 224 moving the location for the object to be outside of the reserved volume. The application reservation engine 224 may make such changes before automatically presenting the object in the new location, or may notify the second application 216 of the new location to allow the second application 216 to accept the new location or cancel the presentation. In some embodiments, deconfliction may occur by the application reservation engine 224 determining a priority between the first application 214 and the second application 216, and may cancel the reservation if the second application 216 has a higher priority than the first application 214. In such an embodiment, the application reservation engine 224 may inform the first application 214 that its reservation was canceled, and may allow the first application 214 to change the reservation to compensate. The method 1100 then proceeds to an end block and terminates.

Returning to decision block 1110, if rendering the object would not conflict with the reservation, then the result of decision block 1110 is NO, and the method 1100 proceeds to block 1114, where a presentation engine 220 of the augmented reality system 202 presents the object. The method 1100 then proceeds to an end block and terminates.

Figure 12:
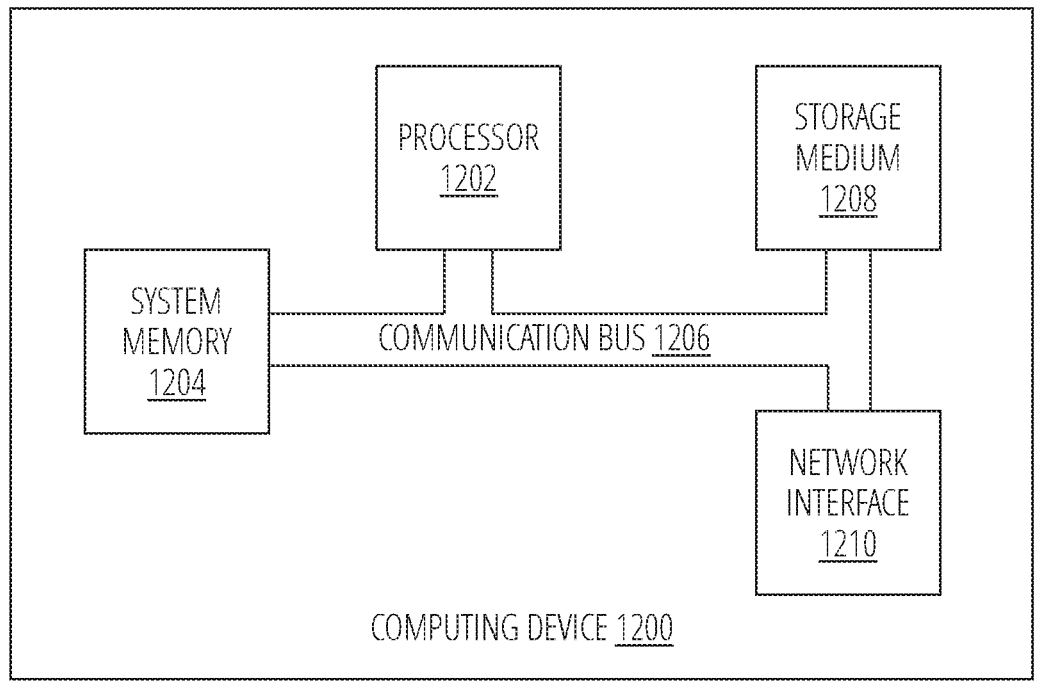
FIG. 12 is a block diagram that illustrates a non-limiting example embodiment of a computing device appropriate for use as a computing device with embodiments of the present disclosure.

FIG. 12 is a block diagram that illustrates aspects of an exemplary computing device 1200 appropriate for use as a computing device of the present disclosure. While multiple different types of computing devices were discussed above, the exemplary computing device 1200 describes various elements that are common to many different types of computing devices. While FIG. 12 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 1200 may be any one of any number of currently available or yet to be developed devices.

In its most basic configuration, the computing device 1200 includes at least one processor 1202 and a system memory 1204 connected by a communication bus 1206. Depending on the exact configuration and type of device, the system memory 1204 may be volatile or nonvolatile memory, such as read only memory ("ROM"), random access memory ("RAM"), EEPROM, flash memory, or similar memory technology. Those of ordinary skill in the art and others will recognize that system memory 1204 typically stores data and/or program modules that are immediately accessible to and/or currently being operated on by the processor 1202. In this regard, the processor 1202 may serve as a computational center of the computing device 1200 by supporting the execution of instructions.

As further illustrated in FIG. 12, the computing device 1200 may include a network interface 1210 comprising one or more components for communicating with other devices over a network. Embodiments of the present disclosure may access basic services that utilize the network interface 1210 to perform communications using common network protocols. The network interface 1210 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 1210 illustrated in FIG. 12 may represent one or more wireless interfaces or physical communication interfaces described and illustrated above with respect to particular components of the computing device 1200.

In the exemplary embodiment depicted in FIG. 12, the computing device 1200 also includes a storage medium 1208. However, services may be accessed using a computing device that does not include means for persisting data to a local storage medium. Therefore, the storage medium 1208 depicted in FIG. 12 is represented with a dashed line to indicate that the storage medium 1208 is optional. In any event, the storage medium 1208 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 1202, system memory 1204, communication bus 1206, storage medium 1208, and network interface 1210 are known and commercially available. For ease of illustration and because it is not important for an understanding of the claimed subject matter, FIG. 12 does not show some of the typical components of many computing devices. In this regard, the computing device 1200 may include input devices, such as a keyboard, keypad, mouse, microphone, touch input device, touch screen, tablet, and/or the like. Such input devices may be coupled to the computing device 1200 by wired or wireless connections including RF, infrared, serial, parallel, Bluetooth, Bluetooth low energy, USB, or other suitable connections protocols using wireless or physical connections. Similarly, the computing device 1200 may also include output devices such as a display, speakers, printer, etc. Since these devices are well known in the art, they are not illustrated or described further herein.

What is claimed is:

1. A computer-implemented method of presenting augmented-reality annotations of real-world objects, the method comprising:
   detecting, by an augmented reality system, a real-world object;
   creating, by an operating system of the augmented reality system, a software object that represents the real-world object;
   receiving, by the operating system, a first request from a first application to present a first virtual object, the first request referencing the software object and including a first virtual object type associated with a first relative presentation location, wherein the first relative presentation location indicates an area relative to the real-world object in which to present the first virtual object;
   determining, by the operating system, a first location for the first virtual object, wherein the first location is determined based on the first relative presentation location; and
   presenting, by the augmented reality system, the first virtual object at the first location such that the first virtual object appears to a user of the augmented reality system to be present at the first location.

2. The computer-implemented method of claim 1, further comprising:
   receiving, by the operating system, a second request from a second application to present a second virtual object, the second request referencing the software object; and
   determining, by the operating system, a second location for the second virtual object, wherein the second location is associated with the real-world object and is based in part on the first location for the first virtual object.

3. The computer-implemented method of claim 2, wherein determining the first location for the first virtual object includes determining the first location based in part on the second location for the second virtual object.

4. The computer-implemented method of claim 1, further comprising receiving, by the operating system, a second request from a second application to present a second virtual object, wherein the second request references the software object, wherein the second request includes a second virtual object type, and wherein the second virtual object type matches the first virtual object type and is also associated with the first relative presentation location.

5. The computer-implemented method of claim 4, wherein the first relative presentation location is a flexible relative location, and wherein the method further comprises;
   determining, by the operating system, a second location for the second virtual object, wherein the second location is determined based on the first relative presentation location and the first location for the first virtual object;
   determining, by the operating system, a new location for the first virtual object, wherein the new location is determined based on the first relative presentation location and the second location for the second virtual object; and
   presenting, by the augmented reality system, the first virtual object at the new location and the second virtual object at the second location such that the first virtual object appears to the user of the augmented reality system to be present at the new location and the second virtual object appears to the user of the augmented reality system to be present at the second location.

6. The computer-implemented method of claim 4, wherein the first relative presentation location is a static relative location, and wherein the method further comprises determining, by the operating system, a prioritization of the first request and the second request.

7. The computer-implemented method of claim 6, wherein the method further comprises, in response to determining that the first request is prioritized over the second request, denying the second request.

8. The computer-implemented method of claim 6, wherein the method further comprises, in response to determining that the second request is prioritized over the first request, replacing a presentation of the first virtual object with a presentation of the second virtual object.

9. The computer-implemented method of claim 1, wherein presenting the first virtual object at the first location includes at least one of generating a visual presentation and an auditory presentation at the first location.

10. An augmented reality system, comprising:
   at least one environmental sensor device;
   at least one motion sensor device;
   at least one presentation device; and
   an augmented reality platform device communicatively coupled to the at least one environmental sensor device, the at least one motion sensor device, and the at least one presentation device;
   wherein the augmented reality platform device includes at least one processor and a non-transitory computer-readable medium having computer-executable instructions stored thereon that, in response to execution by the at least one processor, cause the augmented reality system to perform actions for presenting augmented-reality annotations of real-world objects, the actions comprising:
      detecting, by the augmented reality system, a real-world object;
      creating, by an operating system of the augmented reality system, a software object that represents the real-world object;
      receiving, by the operating system, a first request from a first application to present a first virtual object, the first request referencing the software object and including a first virtual object type associated with a first relative presentation location, wherein the first relative presentation location indicates an area relative to the real-world object in which to present the first virtual object;
      determining, by the operating system, a first location for the first virtual object, wherein the first location is determined based on the first relative presentation location; and
      presenting, by the augmented reality system, the first virtual object at the first location such that the first virtual object appears to a user of the augmented reality system to be present at the first location.

11. The augmented reality system of claim 10, wherein the actions further comprise:
   receiving, by the operating system, a second request from a second application to present a second virtual object, the second request referencing the software object; and
   determining, by the operating system, a second location for the second virtual object, wherein the second location is associated with the real-world object and is based in part on the first location for the first virtual object.

12. A computer-implemented method of presenting augmented-reality annotations of real-world objects, the method comprising:
   receiving, by an augmented reality system, a reservation from a first application, wherein the reservation specifies a location reserved by the first application;
   receiving, by the augmented reality system, a request from a second application to generate a presentation;
   in response to determining that the presentation would not conflict with the reservation, generating, by the augmented reality system, the presentation; and
   in response to determining that the presentation would conflict with the reservation, deconflicting, by the augmented reality system, the presentation and the reservation.

13. The computer-implemented method of claim 12, wherein the location specified by the reservation is a static real-world location.

14. The computer-implemented method of claim 12, wherein the location specified by the reservation is a dynamic real-world location associated with a real-world object.

15. The computer-implemented method of claim 12, wherein the location specified by the reservation is a volume.

16. The computer-implemented method of claim 12, wherein the location specified by the reservation is for an apparent auditory position.

17. The computer-implemented method of claim 12, wherein deconflicting the presentation and the reservation includes denying the request from the second application to generate the presentation.

18. The computer-implemented method of claim 12, wherein deconflicting the presentation and the reservation includes moving, by the augmented reality system, a location associated with the presentation to be outside of the reservation.

19. The computer-implemented method of claim 12, wherein deconflicting the presentation and the reservation includes changing, by the augmented reality system, a transparency level associated with the presentation.

* * * * *